(12) United States Patent
York et al.

(10) Patent No.: US 11,997,730 B2
(45) Date of Patent: May 28, 2024

(54) ESTABLISHING PAIRING BETWEEN FIREARM ACCESSORIES

(71) Applicant: Sig Sauer, Inc., Newington, NH (US)

(72) Inventors: Andrew W. York, Portland, OR (US); Luke C. Corbin, Beaverton, OR (US)

(73) Assignee: SIG SAUER, INC., Newington, NH (US)

( * ) Notice: Subject to any disclaimer, the term of this patent is extended or adjusted under 35 U.S.C. 154(b) by 138 days.

(21) Appl. No.: 17/152,729

(22) Filed: Jan. 19, 2021

(65) Prior Publication Data

US 2021/0227605 A1 Jul. 22, 2021

Related U.S. Application Data

(60) Provisional application No. 62/962,756, filed on Jan. 17, 2020.

(51) Int. Cl.
| | |
|---|---|
| *H04W 76/14* | (2018.01) |
| *H04B 17/318* | (2015.01) |
| *H04W 12/06* | (2021.01) |

(52) U.S. Cl.
CPC ........... *H04W 76/14* (2018.02); *H04W 12/06* (2013.01); *H04B 17/318* (2015.01)

(58) Field of Classification Search
USPC ........................................................ 370/310
See application file for complete search history.

(56) References Cited

U.S. PATENT DOCUMENTS

| | | | | |
|---|---|---|---|---|
| 8,089,939 B1* | 1/2012 | Mater | ................... | H04W 36/30 370/332 |
| 2010/0054179 A1* | 3/2010 | Meyer | ................... | H04W 12/04 370/328 |
| 2010/0282845 A1* | 11/2010 | Peters | ....................... | F41G 3/08 42/111 |
| 2011/0216692 A1* | 9/2011 | Lundsgaard | .......... | H04W 48/20 370/328 |
| 2016/0128114 A1* | 5/2016 | Moy | ..................... | H04W 12/50 455/434 |

(Continued)

FOREIGN PATENT DOCUMENTS

EP 2355563 A1 8/2011

OTHER PUBLICATIONS

"Bluetooth Core Specification," Revision v5.2, revised Dec. 31, 2019, 3,256 pages.

(Continued)

*Primary Examiner* — Tejis Daya
*Assistant Examiner* — Oladiran Gideon Olaleye
(74) *Attorney, Agent, or Firm* — Miller Nash LLP

(57) ABSTRACT

A method of pairing a device and a single one of two or more potential pairing devices includes first setting the device in a seek mode and scanning for the potential pairing devices. A list is stored in the device that includes any potential pairing devices discovered while in the seek mode. The list is stored in a sequential order based on a signal strength between the device and each of the discovered potential pairing devices. Then the device determines whether any of the potential pairing devices in the list are set in a predetermined mode, and pairs with the one of the potential pairing devices in the predetermined mode that has the highest signal strength.

12 Claims, 4 Drawing Sheets

(56) References Cited

U.S. PATENT DOCUMENTS

| | | | |
|---|---|---|---|
| 2017/0238161 A1* | 8/2017 | Chakraborty | H04B 17/318 |
| | | | 455/500 |
| 2017/0280277 A1* | 9/2017 | Ge | H04W 4/00 |
| 2019/0128643 A1 | 5/2019 | York et al. | |
| 2021/0095938 A1* | 4/2021 | Clermont | F41G 3/04 |
| 2021/0180917 A1* | 6/2021 | Dikun | F41G 3/06 |

OTHER PUBLICATIONS

International Search Report and Written Opinion of the International Searching Authority issued in international application No. PCT/US2021/014017, dated Mar. 9, 2021, 15 pages.

* cited by examiner

ESTABLISHING PAIRING BETWEEN FIREARM ACCESSORIES

CROSS-REFERENCE TO RELATED APPLICATIONS

This application is a non-provisional of and claims benefit to U.S. provisional patent application No. 62/962,756, filed Jan. 17, 2020, entitled ESTABLISHING PAIRING BETWEEN ELECTRICAL DEVICES, the disclosure of which is incorporated herein by reference in its entirety.

FIELD

This disclosure relates to electronic firearm accessories, and, more particularly, to a method of pairing two accessories together to establish a wireless communication channel between them.

BACKGROUND

Firearm accessories, such as rangefinders and riflescopes, often work together. For example, a rangefinder may send target ranging information to a riflescope. In some sophisticated systems, a rangefinder may include ballistics solutions based on the determined range to target and pass such information to the riflescope. These solutions provide convenience and enhanced capabilities for the shooter.

It is occasionally difficult to pair accessory devices to one another. In this context, pairing means establishing a wireless communication channel between the devices, which may be exclusive. Pairing wireless devices is sometimes frustrating because oftentimes the devices must be placed in particular modes. Entering the modes means pressing buttons or navigating menus in a particular way, on both devices, which may be time consuming or confusing. Sometimes a user will place both devices in seek mode or both in find mode. Even after the device has entered a seek or find mode, these modes typically have relatively short timeout periods, to save battery life and for other reasons. Other frustrations include a lack of communication back to the user that indicates why the devices are not pairing correctly.

Embodiments of the disclosure address these and other limitations of the art.

DETAILED DESCRIPTION

Some embodiments of the above-described riflescope may be implemented on one or more riflescopes described U.S. patent application Ser. No. 16/158,062, which is incorporated by reference herein in its entirety. This incorporated application describes a riflescope that can establish a wireless communication channel, such as BLUETOOTH™ pairing. BLUETOOTH™ refers to a communication protocol that allows two compatible devices to establish a wireless communication channel between them.

The fundamental basics of the BLUETOOTH™ protocol are well known in the art, and thus detailed description is omitted. For a detailed discussion, please see the BLUETOOTH™ Core Specification Revision v.5.2, which is incorporated by reference herein.

Figure 1:
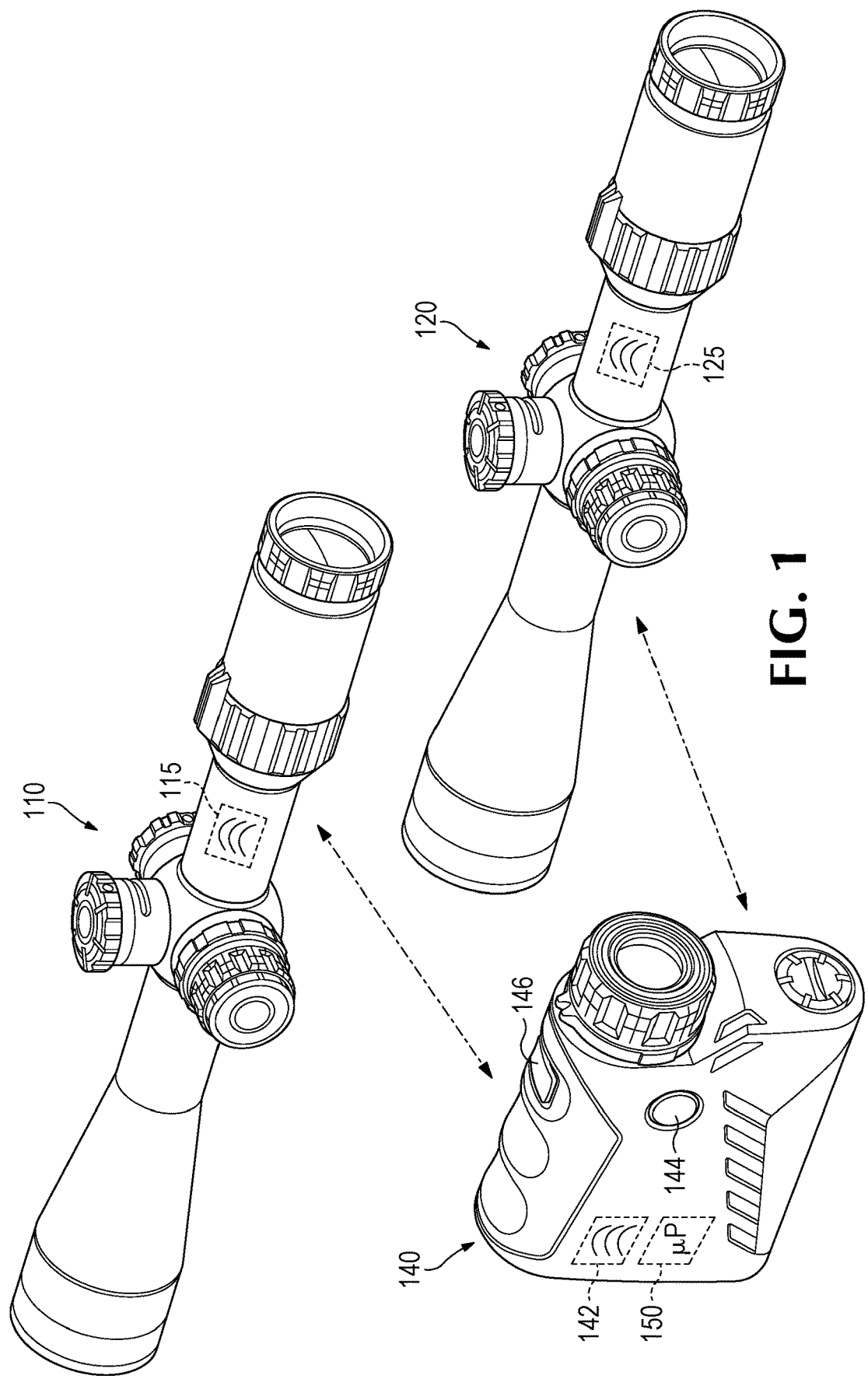
FIG. 1 illustrates pairing of a rangefinder with one of two riflescopes according to embodiments of the invention.

FIG. 1 illustrates BLUETOOTH™ pairing of a rangefinder 140 with either a riflescope 110 or a riflescope 120 according to embodiments of the invention. In this disclosure, BLUETOOTH™ pairing according to embodiments of the invention described herein may be referred to as establishing a bond, or a quickbond. Although only two riflescopes 110, 120 are illustrated in FIG. 1, embodiments of the invention are operable with any number of BLUETOOTH™ devices. The user may find himself or herself in an entire room of BLUETOOTH™ devices, such as when a group of hunters or target shooters are together in close quarters, such as a briefing room before going out on a course. BLUETOOTH™ devices in such a room may include not only a rangefinder 140 and one or more riflescopes 110, 120, but cell phones, music speakers, headphones, fitness trackers, and smart watches that typically include BLUETOOTH™ communication as well. Embodiments of the invention work well in such situations to minimize the potential confusion and allow each shooter's equipment to easily pair with the desired device, rather than potentially pairing with several, or dozens of other BLUETOOTH™ devices.

The rangefinder 140 includes a mode button 144 which is selectable by a user to cause the rangefinder to enter or change to one or more operating modes. The rangefinder 140 also includes a ranging button 146 which, in an operation mode, causes the rangefinder to determine a distance to a target. In other modes the ranging button 146, or other buttons or user controllable components of the rangefinder 140 may cause the rangefinder to perform different functions. The rangefinder 140 includes a microprocessor or microcontroller 150, which controls the electronic functions of the rangefinder. The rangefinder 140 also includes a wireless transceiver 142, such as a BLUETOOTH™ transceiver that allows the rangefinder to establish a wireless communication channel between the rangefinder and another device. The riflescopes 110, 120 similarly include a wireless transceiver 115, 125, respectively, so that they may be in wireless communication with the rangefinder 140.

Figure 2:
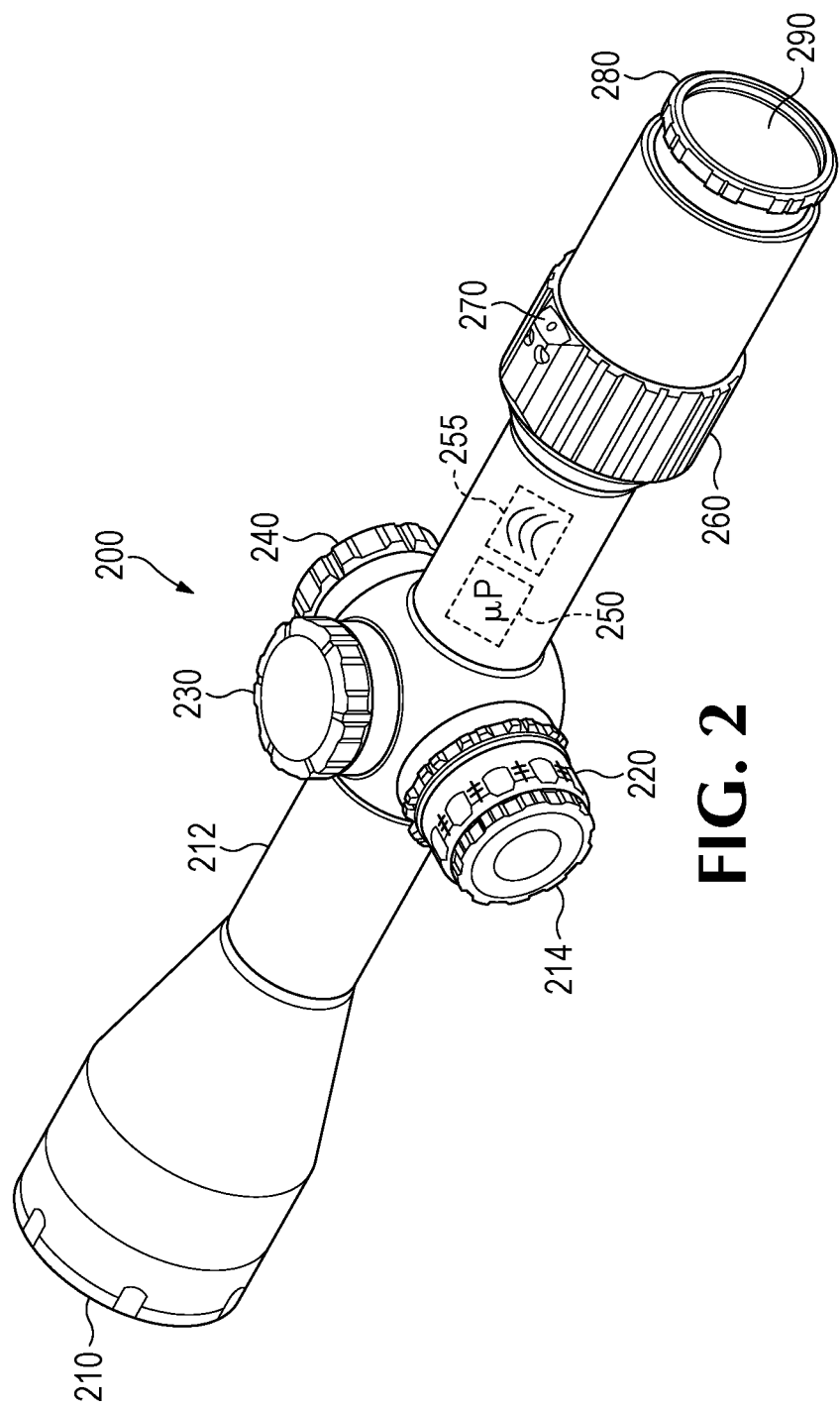
FIG. 2 is a perspective view of details of a riflescope that is operable to establish a pairing between devices according to embodiments of the invention.

FIG. 2 is a perspective view of a riflescope that is operable to establish a pairing between wireless devices according to embodiments of the invention. With reference to FIG. 2, included in an example riflescope 200 are an objective lens 210, main tube 212, battery port cover 214, illumination power selector ring 220, elevation dial 230, wind or windage dial 240, magnification power selector ring 260, wireless communication indicator 270, diopter adjustment 280 and ocular lens 290. Also included is a microprocessor system 250 which functions to operate and control the electronic portion of the riflescope 200. The microprocessor system 250, as described below, may include one or more microprocessors or microcontrollers, inputs and outputs to operate the riflescope 200. Further included in the riflescope 200 is a wireless transceiver 255 that sends and receives wireless signals according to one or more protocols. In practice, according to embodiments of the invention, the wireless transceiver 255 is used to establish the wireless communication channel between the riflescope 200 and another wireless device.

Figure 3:
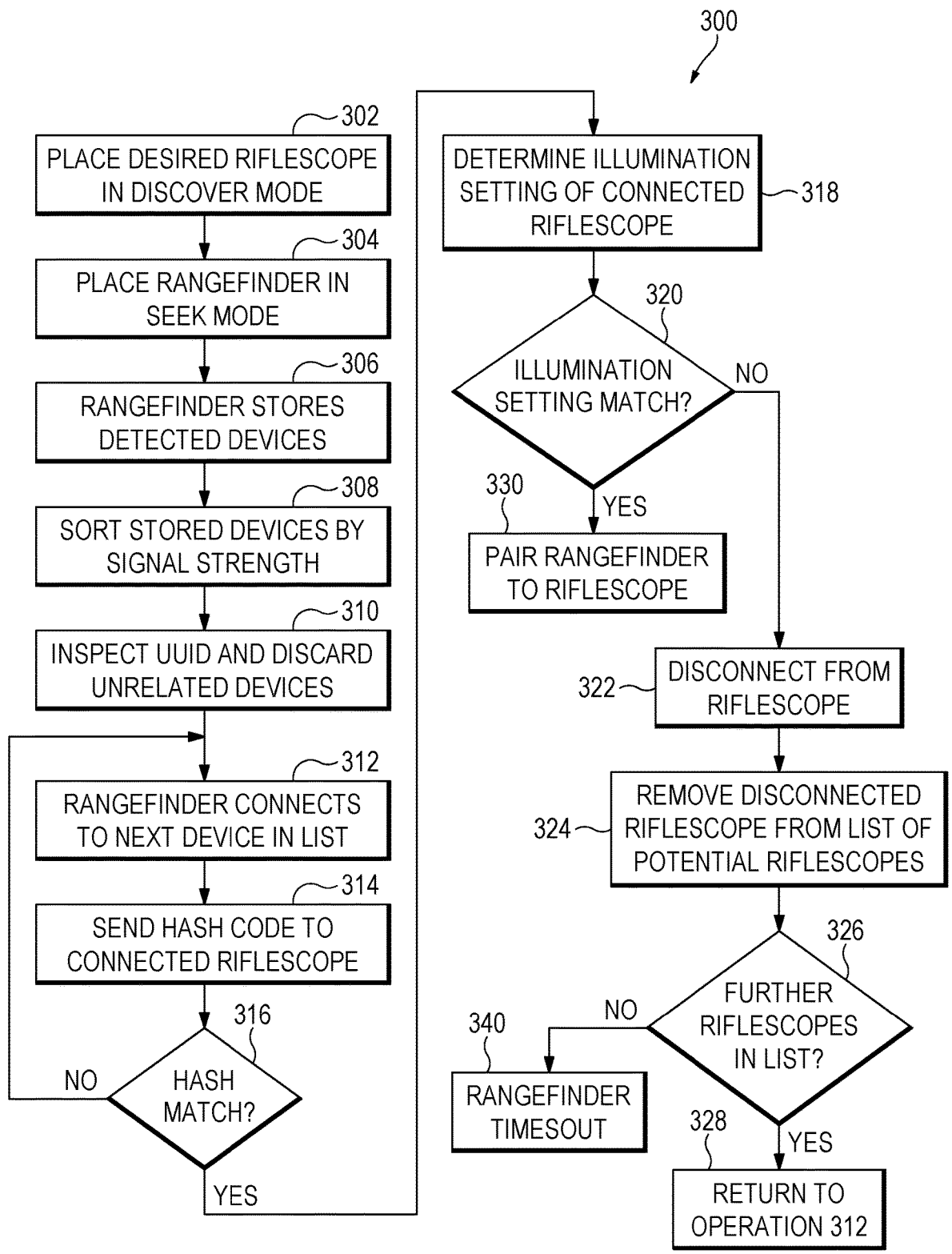
FIG. 3 is a flow chart illustrating example operations of establishing pairing between devices according to embodiments of the invention.

FIG. 3 is a flow chart illustrating example operations of establishing pairing between devices according to embodiments of the invention. In one embodiment, to initiate the process to establish a pairing between a riflescope, such as the riflescope 200 of FIG. 2 with another device, such as the rangefinder 140 of FIG. 1, the user places the desired riflescope in a discoverable mode in an operation 302. The user may do this by pressing a button, turning one of the rings on the riflescope to a pre-determined position, or taking another action. In the embodiment described with reference to FIG. 3, the riflescope is placed in the discoverable mode by the user turning the illumination mode knob 120 to illumination mode 1.

Next, the device to which the riflescope 200 is to be paired is placed in a seek mode. In the present example the riflescope 200 is to be paired with a rangefinder, such as the rangefinder 140 of FIG. 1. Of course, the riflescope 200 may be paired with any device that includes a wireless transceiver and operates according to or compatible with the pairing protocol described herein. In the present example, the device to be paired is the rangefinder 140, and thus the rangefinder is placed in a seek mode in an operation 304. In one embodiment the user may place the rangefinder 140 into the seek mode by pressing certain buttons on the rangefinder. For example, in one embodiment the user may enter the seek mode on the rangefinder 140 by pressing and holding down both the mode button 144 and range button 146 on the rangefinder for at least 3 seconds. This puts the rangefinder 140 in seek mode.

Next, after the rangefinder 140 is put in seek mode, the rangefinder searches for all BLUETOOTH™ devices within communication range of the rangefinder that are in a discoverable mode. Recall that the riflescope 200 was placed in the discoverable mode in operation 302. While in the seek mode during operation 304, the rangefinder gathers at least some initial information about all of the devices that are in discover mode to which it can connect, such as signal strength, Universally Unique Identifier (UUID) of the device, as well as other information.

Next, in an operation 306, the rangefinder 140 stores the devices detected after being placed in seek mode. As described above, during its seek mode of operation 304 the rangefinder 140 may find several or even dozens of wireless devices that are in discover mode that the rangefinder may potentially connect to. After storing the detected devices in the operation 306, the rangefinder sorts the devices in an operation 308 according to the signal strength of the devices that responded during its seek mode.

Next, in an operation 310, the rangefinder 140 inspects the UUIDs of devices stored in operation 306 to determine if the devices are ones to which the rangefinder will pair. For instance, the rangefinder 140 may inspect the UUID and discard all music speakers, headphones, watches, and fitness trackers that may have been in discover mode while keeping only those devices in the list having a correct UUID, or class of UUID that identifies it as a device that is connectable to the rangefinder 140. Other UUIDs are discarded.

After operation 310, the rangefinder 140 is storing only those devices that were in discover mode while the rangefinder was in seek mode, and only those devices that have a qualifying UUID code. Next, in an operation 312, the rangefinder 140 connects to the next riflescope on the list. The first time through the flow 300, the rangefinder 140 first couples to the riflescope that has the highest signal strength, because it is the highest on the list.

After the rangefinder 140 connects to the particular riflescope, a hash code is sent to the riflescope to unlock the riflescope in an operation 314. Only proper hash codes will unlock the riflescope, which prevents the riflescope from being improperly paired with another BLUETOOTH™ device. If the hash code sent by the rangefinder 140 matches an authorized hash code on the riflescope 200, the connected riflescope is unlocked, and is authorized to send additional information to the rangefinder. The hash code match is performed in an operation 316. If the hash code sent by the rangefinder 140 does not match, it exits operation 316 in the NO direction and the rangefinder drops the non-hash-matching riflescope from its list. Then the flow 300 loops back to operation 312 to connect to the next device in the list.

If instead the hash code sent by the rangefinder matches the hash code expected by the riflescope, then the operation 316 exits in the YES direction, and the connected riflescope is unlocked. Unlocking the riflescope means that additional data will be sent to the rangefinder 140, because the rangefinder sent an expected hash code while the riflescope was connected to the rangefinder.

Next, in an operation 318, rangefinder 140 determines the illumination setting of the connected riflescope. Recall that the riflescope was placed in the discoverable mode by the user turning the illumination mode knob 120 to illumination mode 1. Therefore, in the operation 318, the rangefinder retrieves the illumination setting of the connected riflescope.

In a comparison operation 320, the rangefinder determines the illumination setting of the connected riflescope. If the illumination setting of the connected riflescope is "1", or whatever matches a pre-determined setting, then the rangefinder is paired with that device, and an electronic communication channel, or quickbond, is established in an operation 330.

If instead the riflescope to which the rangefinder 140 is connected does not have an illumination setting of "1", then the rangefinder disconnects from that riflescope in an operation 322 and removes the presently connected riflescope from the list of potential riflescopes in an operation 324. If there are further riflescopes in the list to be checked, as determined in an operation 326, then the flow 300 returns to the operation 312, through an operation 328, where the rangefinder 140 connects with the next riflescope in the list. Then, the operations 314, 316, 318, and 320 are repeatedly performed in a loop until a riflescope is found having an illumination setting of 1, at which time the rangefinder 140 is paired with that riflescope in an operation 330. If instead the operation 326 determines that there are no further riflescopes in the list of potential riflescopes with which the pair the rangefinder, then the rangefinder 140 may timeout 340 to preserve battery.

Recall that the list of potential riflescopes was originally placed in a list based on signal strength in the operation 308. Therefore, embodiments of the invention have the effect of automatically connecting to the riflescope that is closest to the rangefinder that has the correct hash code, and that has the correct illumination setting.

In a preferred embodiment, a display of the rangefinder 140 will inform the user when the rangefinder 140 is searching for or has been paired with the riflescope, such as by displaying BOND, or GOOD. Also, the riflescope 200 may generate an indicator that it is bonded to the rangefinder 140, such as by illuminating an LED on the riflescope.

Using the above-described method, the rangefinder 140 bonds with closest device that is in the proper mode. This allows a user of a rangefinder to pair with his or her riflescope even when there are several riflescopes nearby, such as in a group of hunters.

As mentioned above, although the example pairing described above was given with reference to pairing a rangefinder 140 with a riflescope 200, embodiments of the invention may be used to pair any two devices through a wireless channel. Further, although this description was given with reference to BLUETOOTH™ as the wireless communication protocol, embodiments of the invention may additionally work with other base wireless protocols, such as WIFI, Zigbee, Z-wave, or others.

Figure 4:
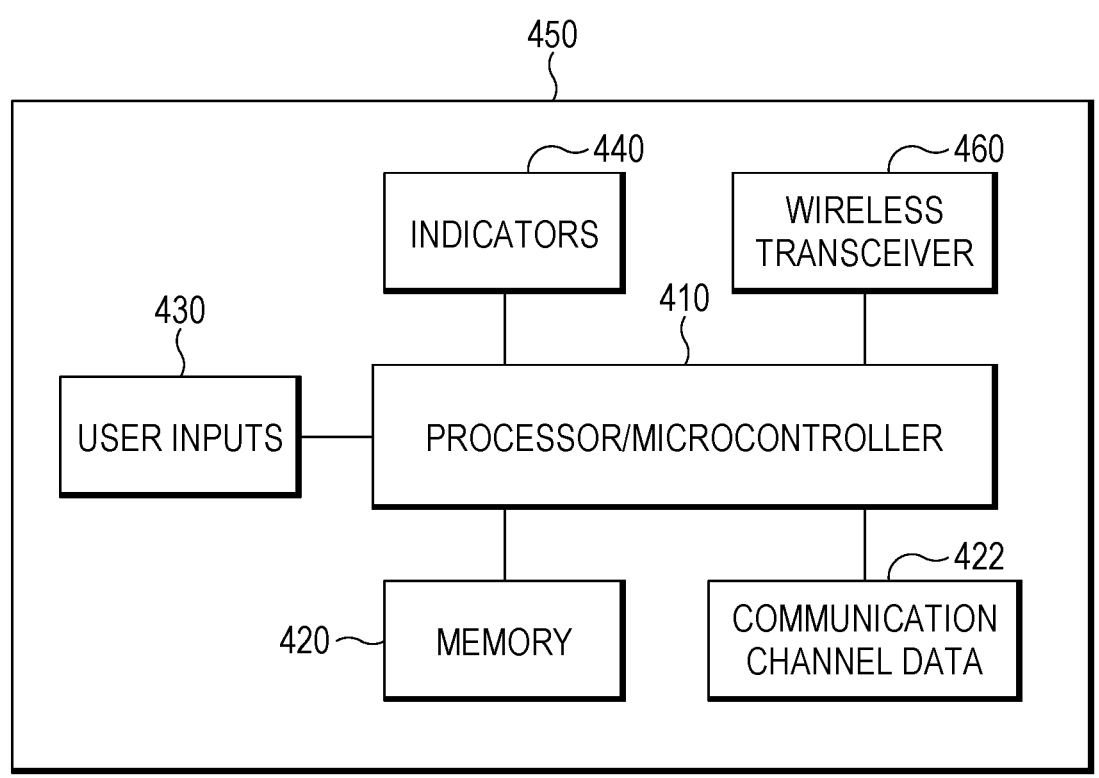
FIG. 4 is a block system diagram illustrating components of a microcontroller or microprocessor used in the pairing according to embodiments of the invention.

FIG. 4 is a block diagram of an example processor system 450, which may perform the main operations described in the flow 300 of FIG. 3. In some embodiments the example processor system 450 may be used as the microcontroller or microprocessor system 150 of the rangefinder 140 described above. In other embodiments the example processor system 450 may be used as the microcontroller or microprocessor system 250 of the riflescope 200 described above. Note that each of the rangefinder 140 and riflescope 200 may include separate processor systems 450, both of which are configured for their specific purpose.

The processor system 450 includes a central processor or microcontroller 410 configured or programmed to perform the quickbond, or establishing wireless pairing as described above. Although only one processor 410 is shown in FIG. 4 for ease of illustration, as will be understood by one skilled in the art, any number of processors or microcontrollers 410 of varying types may be used in combination, rather than a single processor.

The processor or microcontroller 410 may be configured to execute instructions from a memory 420 and may perform any methods and/or associated steps indicated by such instructions, such as checking hash codes and determining if the illumination setting of the riflescope matches the predetermined setting. The memory 420 may be implemented as processor cache, random access memory (RAM), read only memory (ROM), solid state memory, non-volatile memory, such as flash RAM or flash ROM, hard disk drive(s), or any other memory type. In some embodiments the memory 420 is integrated with the processor or microcontroller 410. The memory 420 acts as a medium for storing data, computer program products, and other instructions.

In some embodiments the communication data, such as hash codes, UUIDs, illumination settings, list of potential devices to pair with, etc. may be stored in a separate memory 422, which may be non-volatile memory, flash ROM, flash RAM, or any of the other memory types described above.

User inputs 430 are coupled to the one or more processors 410. User inputs 430 may include one or more pushbuttons, a selectable menu, touchscreen, and/or any other controls employable by a user to interact with the sight. In some embodiments the user inputs 430 are buttons on the rangefinder 140. In some embodiments the user inputs 430 are rings or dials, such as the illumination power selector ring 220, elevation dial 230, wind or windage dial 240, and magnification power selector ring 260 described above with reference to FIG. 2, for example. In some embodiments the user inputs 430 may be made on another device, such as a mobile phone or computer and sent through a communication channel, wired or wireless, to the processor system 450.

The one or more processors 410 may control one or more indicators 440, such as the wireless communication indicator 270 on the riflescope 200, or any other visual indicator on the riflescope. On the rangefinder the one or more indicators 440 may be a controllable LED, or a indicator that may appear in the field of view of the viewfinder. Such indicators 440 may be used to communicate the state of the riflescope and/or rangefinder, such as whether they are paired successfully. Such indicators 440 may also indicate to the user that there is an error condition with the riflescope 200 and/or rangefinder 140.

The microprocessor/microcontroller 410 may also drive the wireless transceiver 460 in the rangefinder 140 and/or riflescope 200. The microprocessor/microcontroller 410 may cause the wireless transceiver to send and receive wireless signals. In short, the processor system 450 controls all of the electronic operations of each of the rangefinder 140 and riflescope 200.

The aspects of the present disclosure are susceptible to various modifications and alternative forms. Specific aspects have been shown by way of example in the drawings and are described in detail herein. However, one should note that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

EXAMPLES

Illustrative examples of the technologies disclosed herein are provided below. An example of the technologies may include any one or more, and any combination of, the examples described below.

Example 1 is a method of establishing a wireless communication channel between a first device and a single one of two or more potential pairing devices. The method includes, while the first device is in a seek mode, scanning for the potential pairing devices, in the first device, storing a list of any potential pairing devices that were discovered in the seek mode in a sequential order based on a signal strength between the first device and each of the discovered potential pairing devices, determining whether any of the potential pairing devices in the list is set in a predetermined mode, and establishing the wireless communication channel between the first device and the one of the potential pairing devices in the predetermined mode that has the highest signal strength.

Example 2 is an example according to Example 1 above, further comprising sending a hash code to one of the potential pairing devices that was discovered in the seek mode, and verifying whether the hash code was a correct code.

Example 3 is an example according to Examples 1-2 above, further comprising removing the one of the potential pairing devices from the list that did not match the hash code.

Example 4 is an example according to Examples 1-3 above, further comprising inspecting a UUID of one of the potential pairing devices that was discovered in the seek mode, and removing the one of the potential pairing devices from the list of potential pairing devices when the UUID does not match a predetermined UUID.

Example 5 is an example according to Examples 1-4 above, further comprising inspecting a UUID of one of the potential pairing devices that was discovered in the seek mode, and removing the one of the potential pairing devices from the list of potential pairing devices when the UUID does not match a class of predetermined UUIDs.

Example 6 is an example according to Examples 1-5 above, in which the potential pairing devices in the predetermined mode comprises a riflescope having an illumination setting pre-set to a particular level.

Example 7 is an example according to Examples 1-6 above, in which the first device is a rangefinder.

Example 8 is a device including a wireless transceiver and one or more processors structured cause the device to enter a seek mode, while the device is in a seek mode, scan for the potential pairing devices, store a list of any potential pairing devices that were discovered in the seek mode in a sequential order based on a signal strength between the first device and each of the discovered potential pairing devices, determine whether any of the potential pairing devices in the list is set in a predetermined mode, and establish a wireless communication channel between the device and the one of the potential pairing devices in the predetermined mode that has the highest signal strength.

Example 9 is a device according to Example 8, in which the one or more processors are further configured to send a hash code to one of the potential pairing devices that was discovered in the seek mode, and verify whether the hash code was a correct code.

Example 10 is a device according to Examples 8-9, in which the one or more processors are further configured to remove the one of the potential pairing devices that did not match the hash code.

Example 11 is a device according to Examples 8-10, in which the one or more processors are further configured to inspect a UUID of one of the potential pairing devices that was discovered in the seek mode, and remove the one of the potential pairing devices from the list of potential pairing devices when the UUID does not match a predetermined UUID.

Example 12 is a device according to Examples 8-11, in which the one or more processors are further configured to inspect a UUID of one of the potential pairing devices that was discovered in the seek mode, and remove the one of the potential pairing devices from the list of potential pairing devices when the UUID does not match a class of predetermined UUIDs.

Example 13 is a device according to Examples 8-12, in which the potential pairing devices in the predetermined mode comprises a riflescope having an illumination setting preset to a particular level.

Example 14 is a device according to Examples 8-13, in which the device is a rangefinder.

Additionally, this written description refers to particular features. One should understand that the disclosure in this specification includes all possible combinations of those particular features. For example, where a particular feature is disclosed in the context of a particular aspect, that feature can also be used, to the extent possible, in the context of other aspects.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

In addition, when this application refers to a method having two or more defined steps or operations, the defined steps or operations can be carried out in any order or simultaneously, unless the context excludes those possibilities.

Although specific embodiments have been illustrated and described for purposes of illustration, it will be understood that various modifications may be made without departing from the spirit and scope of the disclosure.

What is claimed is:

1. A method of establishing a wireless communication channel between a first device and a single one of two or more potential pairing devices, the method comprising:
    while the first device is in a seek mode, scanning for the potential pairing devices;
    in the first device, storing a list of any potential pairing devices that were discovered in the seek mode in a sequential order based on a signal strength between the first device and each of the discovered potential pairing devices;
    when the first device has exited the seek mode,
        determining whether any of the potential pairing devices in the list is one or more riflescopes set at a predetermined illumination level, and
        establishing the wireless communication channel between the first device and one of the one or more riflescopes set at the predetermined illumination level that has the highest signal strength.

2. The method according to claim 1, further comprising:
    sending a hash code to one of the potential pairing devices that was discovered in the seek mode; and
    verifying whether the hash code was a correct code.

3. The method according to claim 2, further comprising removing the one of the potential pairing devices from the list that did not match the hash code.

4. The method according to claim 1, further comprising
    inspecting a Universally Unique Identifier (UUID) of one of the potential pairing devices that was discovered in the seek mode; and
    removing the one of the potential pairing devices from the list of potential pairing devices when the UUID does not match a predetermined UUID.

5. The method according to claim 1, further comprising:
    inspecting a Universally Unique Identifier (UUID) of one of the potential pairing devices that was discovered in the seek mode; and
    removing the one of the potential pairing devices from the list of potential pairing devices when the UUID does not match a class of predetermined UUIDs.

6. The method according to claim 1 in which the first device is a rangefinder.

7. A device, comprising:
    a wireless transceiver; and
    one or more processors structured cause the device to:
        enter a seek mode,
        while the device is in a seek mode, scan for the potential pairing devices, store a list of any potential pairing devices that were discovered in the seek mode in a sequential order based on a signal strength between the first device and each of the discovered potential pairing devices, exit the seek mode, determine whether any of the potential pairing devices in the list is one or more riflescopes set in a predetermined illumination mode, and establish a wireless communication channel between the device and one of the one or more riflescopes in the predetermined illumination mode that has the highest signal strength.

8. The device according to claim 7, in which the one or more processors are further configured to:

send a hash code to one of the potential pairing devices that was discovered in the seek mode; and verify whether the hash code was a correct code.

9. The device according to claim 8, in which the one or more processors are further configured to remove the one of the potential pairing devices that did not match the hash code.

10. The device according to claim 7, in which the one or more processors are further configured to:

inspect a Universally Unique Identifier (UUID) of one of the potential pairing devices that was discovered in the seek mode; and remove the one of the potential pairing devices from the list of potential pairing devices when the UUID does not match a predetermined UUID.

11. The device according to claim 7, in which the one or more processors are further configured to:

inspect a Universally Unique Identifier (UUID) of one of the potential pairing devices that was discovered in the seek mode; and remove the one of the potential pairing devices from the list of potential pairing devices when the UUID does not match a class of predetermined UUIDs.

12. The device according to claim 7, in which the device is a rangefinder.

* * * * *